No. 729,952. PATENTED JUNE 2, 1903.
C. O. MILLER.
ELECTRIC BURGLAR ALARM FOR VAULTS, SAFES, OR THE LIKE.
APPLICATION FILED MAR. 29, 1902.
NO MODEL. 8 SHEETS—SHEET 1.

No. 729,952. PATENTED JUNE 2, 1903.
C. O. MILLER.
ELECTRIC BURGLAR ALARM FOR VAULTS, SAFES, OR THE LIKE.
APPLICATION FILED MAR. 29, 1902.
NO MODEL. 8 SHEETS—SHEET 2.

No. 729,952. PATENTED JUNE 2, 1903.
C. O. MILLER.
ELECTRIC BURGLAR ALARM FOR VAULTS, SAFES, OR THE LIKE.
APPLICATION FILED MAR. 29, 1902.
NO MODEL. 8 SHEETS—SHEET 5.

No. 729,952. PATENTED JUNE 2, 1903.
C. O. MILLER.
ELECTRIC BURGLAR ALARM FOR VAULTS, SAFES, OR THE LIKE.
APPLICATION FILED MAR. 29, 1902.
NO MODEL. 6 SHEETS—SHEET 6.

Witnesses
Inventor
C. O. Miller
By R.S.& A.B. Lacey
Attorneys

No. 729,952. PATENTED JUNE 2, 1903.
C. O. MILLER.
ELECTRIC BURGLAR ALARM FOR VAULTS, SAFES, OR THE LIKE.
APPLICATION FILED MAR. 29, 1902.
NO MODEL. 8 SHEETS—SHEET 7.
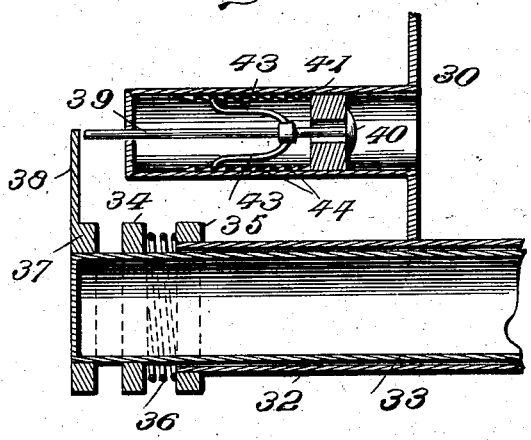
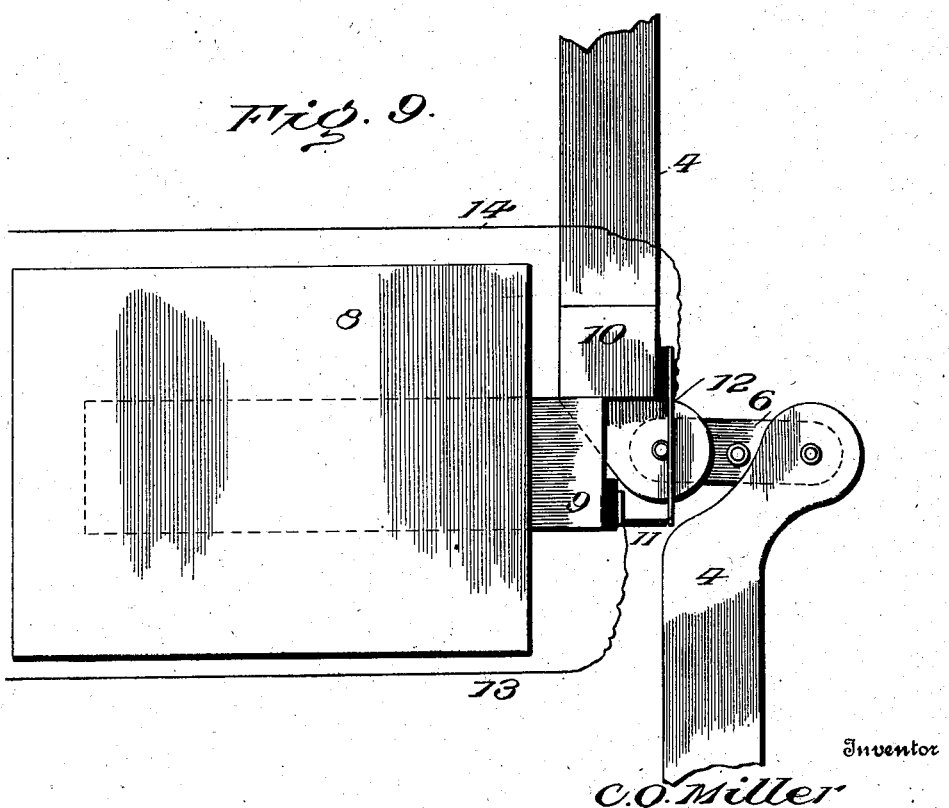

No. 729,952. PATENTED JUNE 2, 1903.
C. O. MILLER.
ELECTRIC BURGLAR ALARM FOR VAULTS, SAFES, OR THE LIKE.
APPLICATION FILED MAR. 29, 1902.
NO MODEL. 8 SHEETS—SHEET 8.
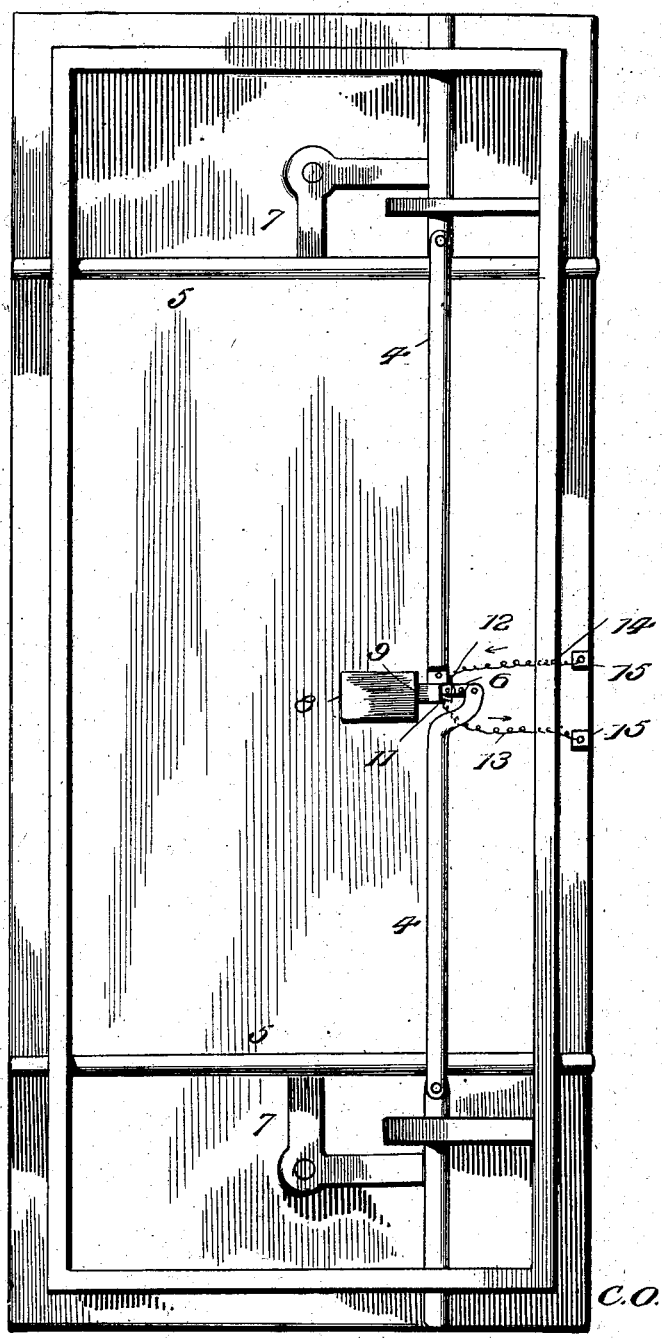

No. 729,952. Patented June 2, 1903.

UNITED STATES PATENT OFFICE.

CHARLES O. MILLER, OF ESTHERVILLE, IOWA.

ELECTRIC BURGLAR-ALARM FOR VAULTS, SAFES, OR THE LIKE.

SPECIFICATION forming part of Letters Patent No. 729,952, dated June 2, 1903.

Application filed March 29, 1902. Serial No. 100,617. (No model.)

*To all whom it may concern:*

Be it known that I, CHARLES O. MILLER, a citizen of the United States, residing at Estherville, in the county of Emmet and State of Iowa, have invented certain new and useful Improvements in Electric Burglar-Alarms for Vaults, Safes, or the Like; and I do hereby declare the following to be a full, clear, and exact description of the invention, such as will enable others skilled in the art to which it appertains to make and use the same.

This invention, which relates to burglar-alarms, contemplates an improved electric alarm mechanism adapted more especially for use in connection with bank vaults and safes, although certain of the parts may be employed to advantage for protecting buildings and rooms therein against unlawful entry.

The invention has for its object the production of a burglar-alarm mechanism which is capable of absolute precision in action and which provides reliable safeguards against every possible effort on the part of the skilled burglar to enter the vault or premises, as the case may be, without instant warning and prompt detection.

The nature of the invention will be readily comprehended, reference being had to the following detailed description and to the accompanying drawings, in which—

Figure 1:
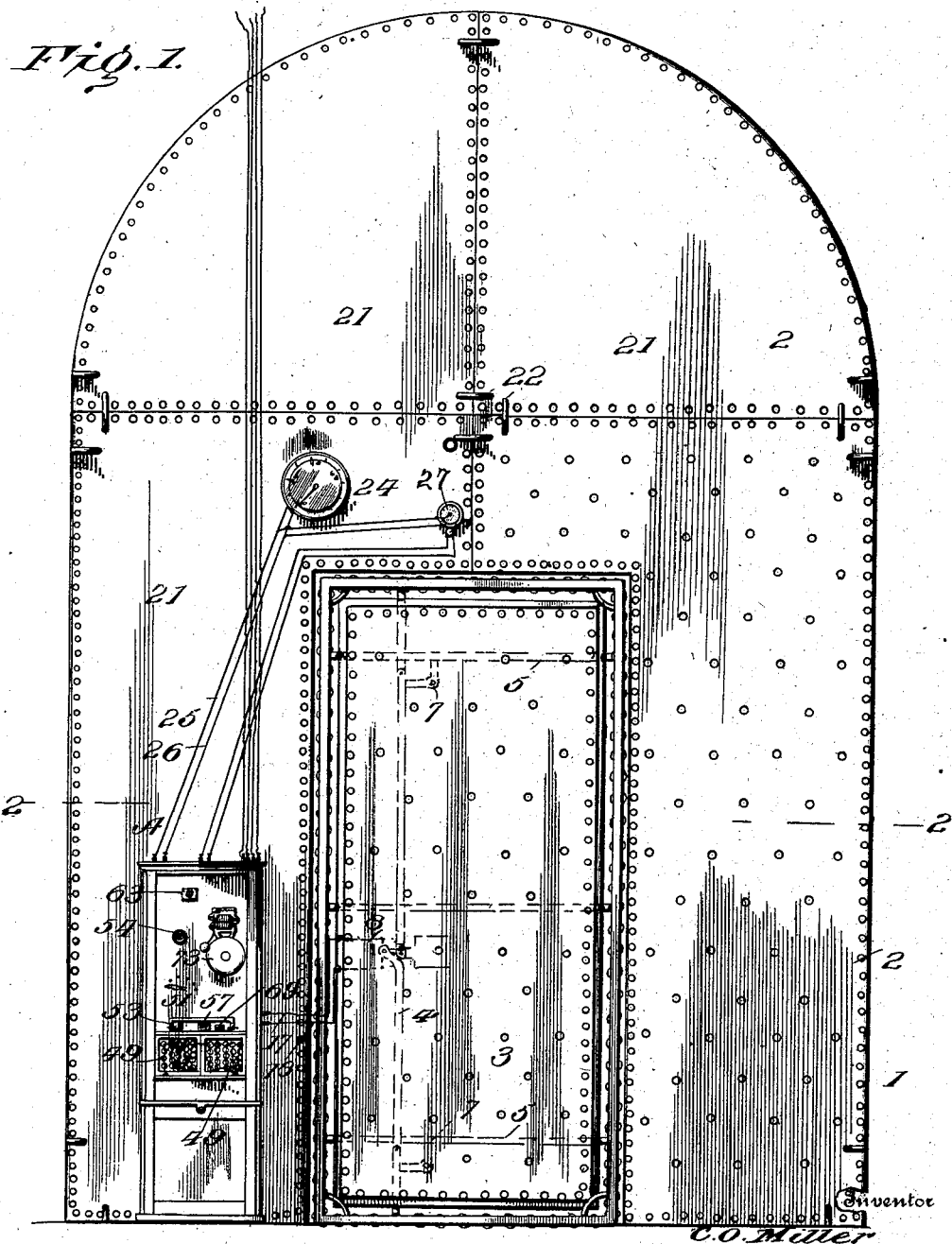
Figure 2:
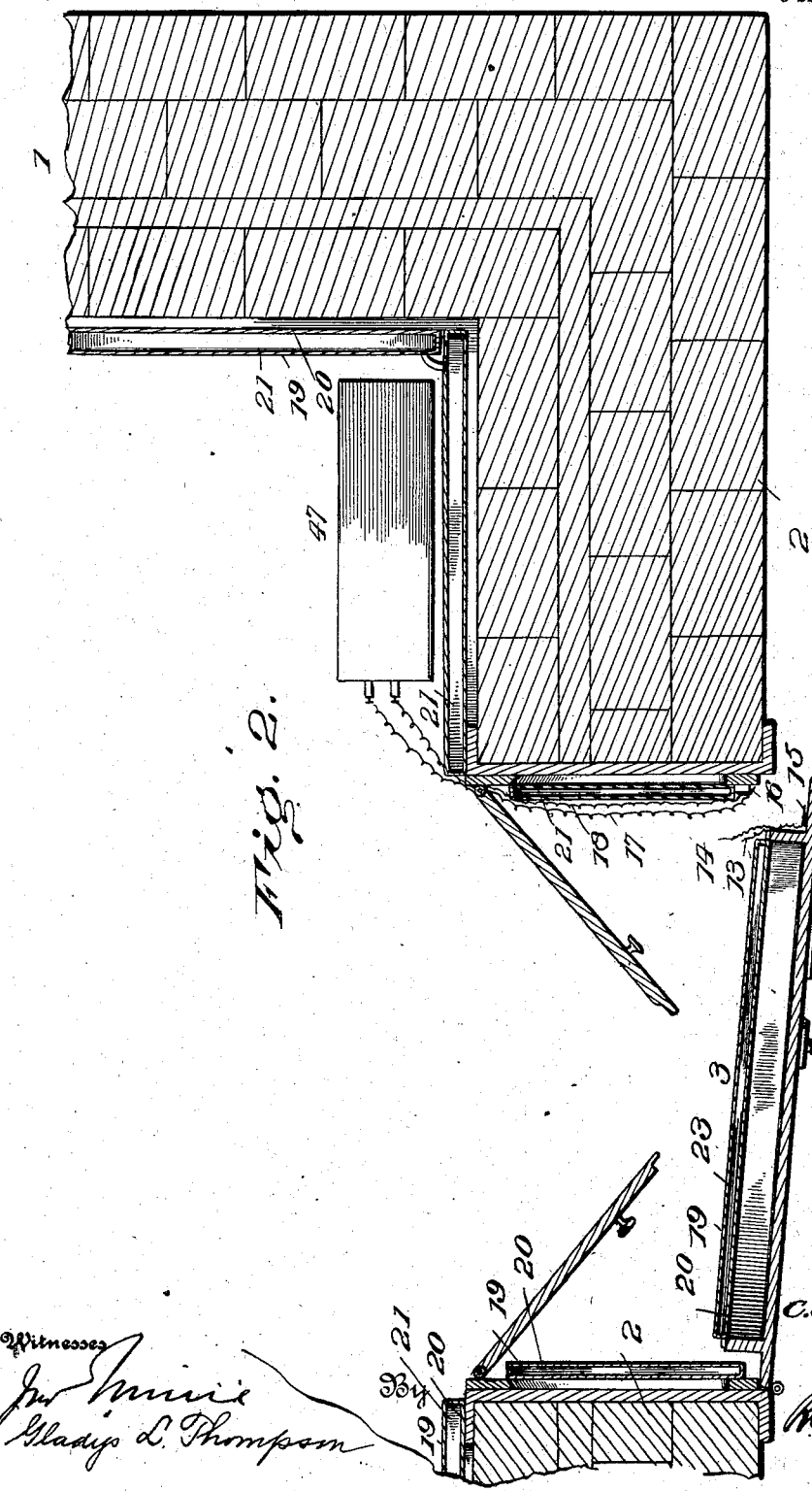
Figure 3:
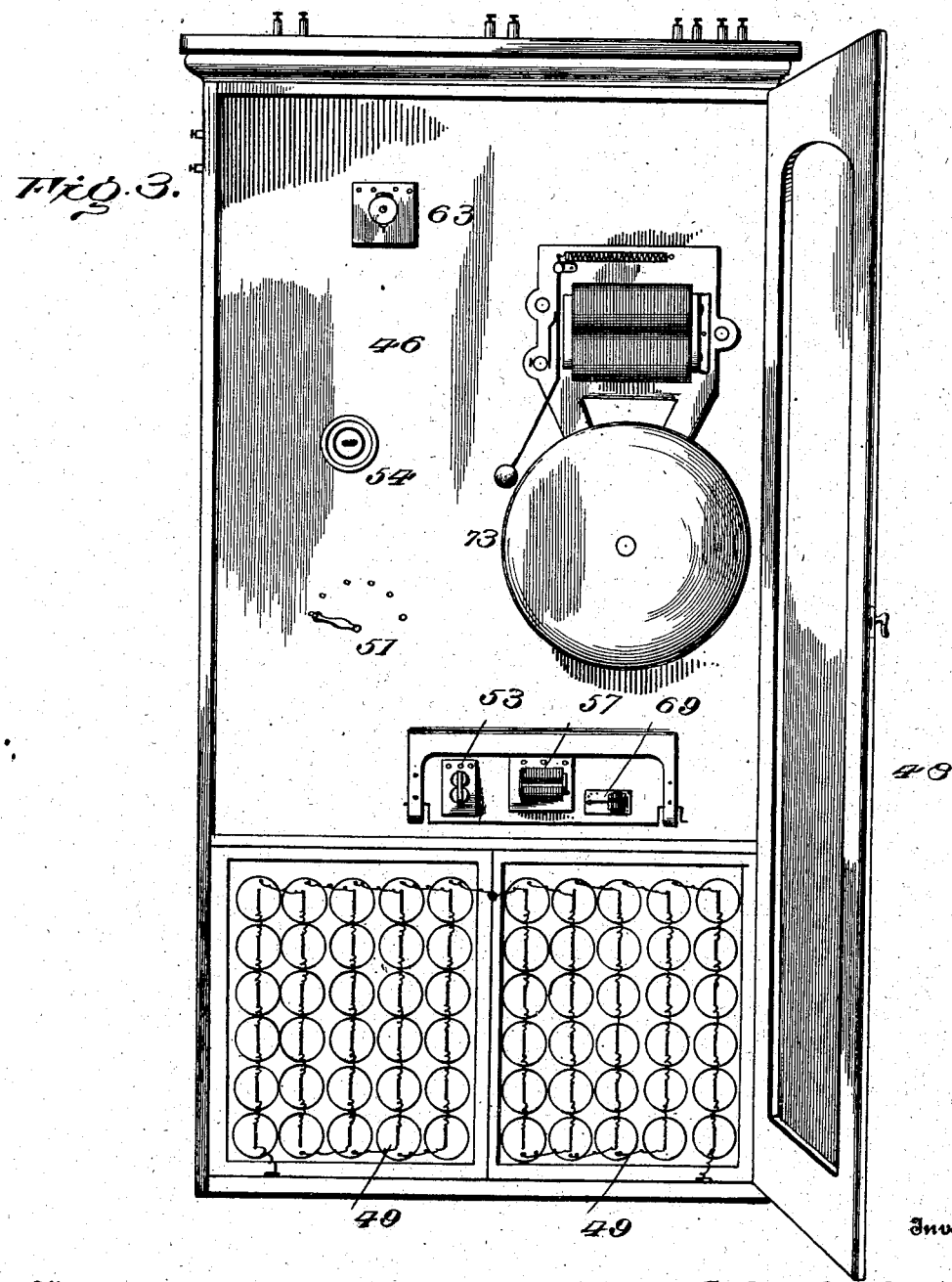
Figure 4:
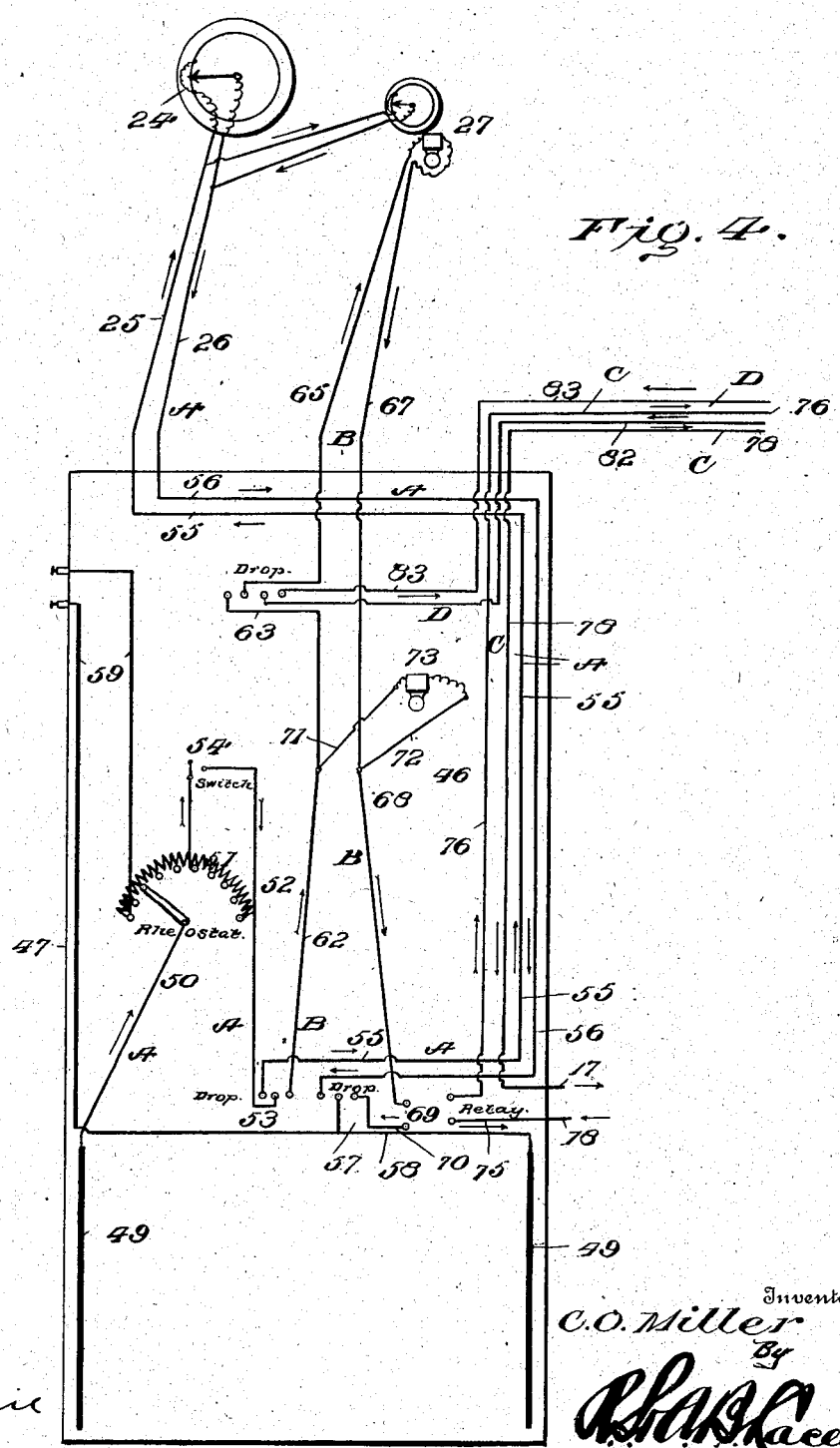
Figure 5:
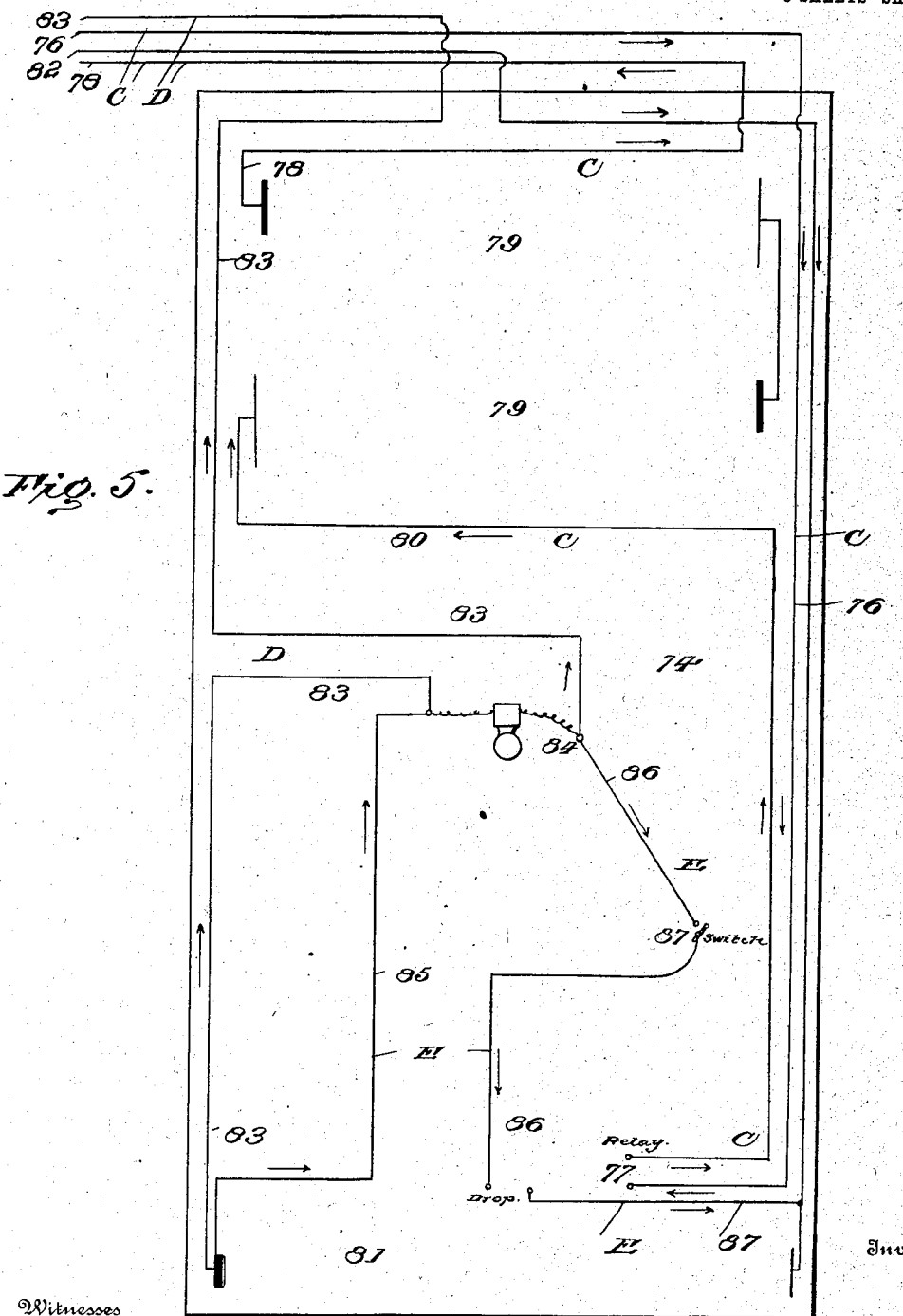
Figure 6:
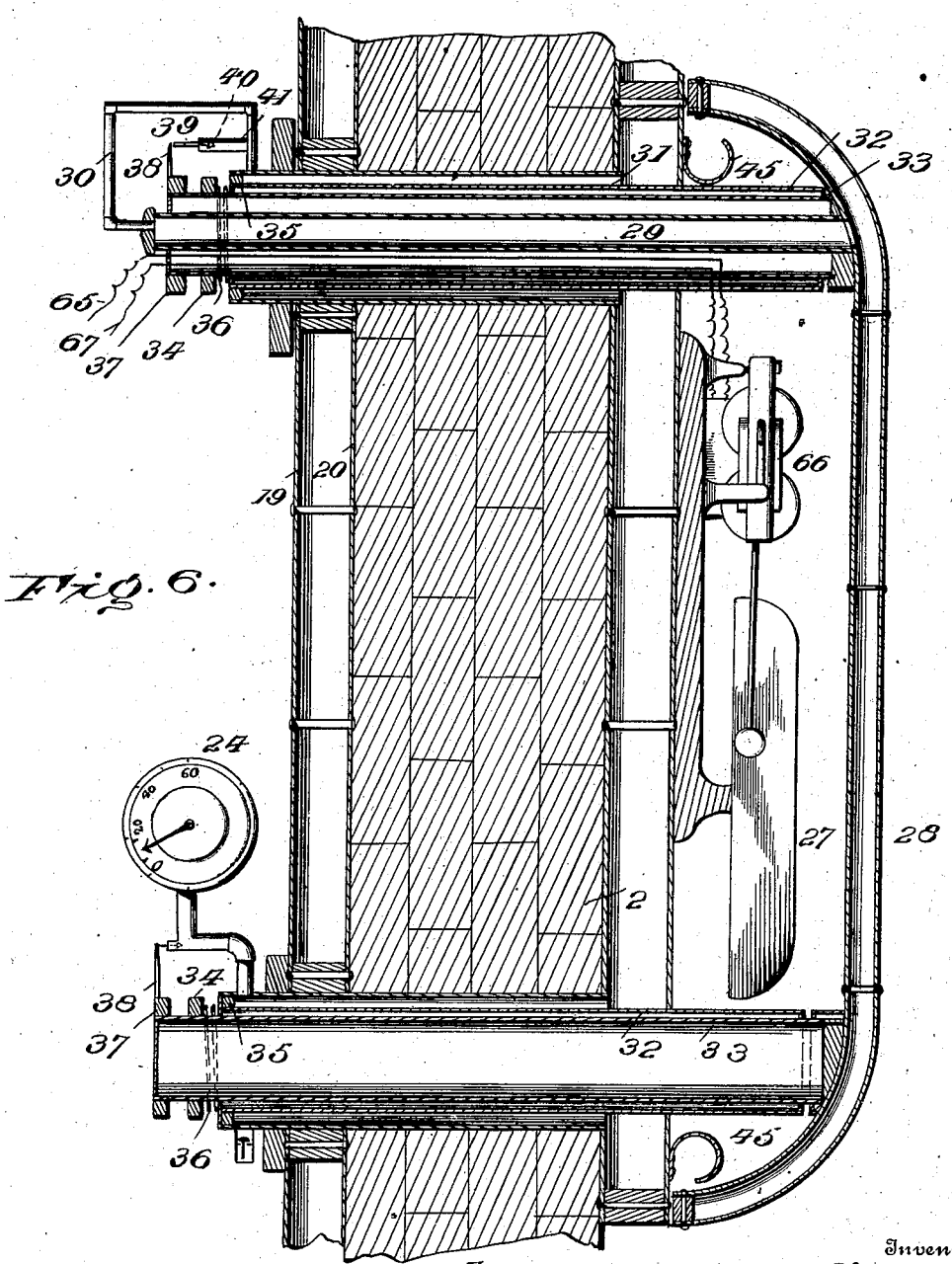

Figure 1 is an inside view of the front of a bank-vault equipped with burglar-alarm mechanism embodying my invention. Fig. 2 is a sectional view, partly broken away, on line 2 2 of Fig. 1. Fig. 3 is a front elevation of the local switchboard. Fig. 4 is a rear view of the local switchboard, showing a diagrammatic view of the electrical connections. Fig. 5 is an elevation of the distant switchboard, showing a diagrammatic view of the electrical connections. Fig. 6 is an enlarged detail view of the vault alarm-gong and its protective casing. Fig. 7 is a further enlarged detail sectional view of the vault-casing, showing the valve employed in connection with the air-jackets. Fig. 8 is a rear elevation of the vault-door. Fig. 9 is an enlarged detail view of the vault-door lock and circuit-closing means.

In the drawings I have shown my invention as applied to a safety-vault suitable for use in banks, safe-deposit companies, jewelry establishments, and the like. Such specific application is not, however, to be regarded as a limitation, as the improvements may, as above stated, be employed to advantage in the protection of safes and other repositories, and certain features thereof may be utilized for protecting buildings and the rooms thereof against unlawful entry.

Referring to the drawings by characters, 1 denotes the vault, preferably constructed of masonry and having a front 2, provided with an entrance-opening closed by a swinging door 3. The door may be equipped with any suitable locking means, such as the vertical draw-bolts 4 4 and the horizontal draw-bolts 5 5, connected to move in unison by the swivel 6 and the pivoted bell-crank levers 7 7. The lock 8 may be of the usual combination or other type, the bolt 9 of which is projected into the path of one of the draw-bolts to maintain the latter in fastening position. In the construction which I prefer to employ there is provided on the lower end of the upper draw-bolt 4 a block 10, which when the parts are in locking position shoulders against the top of the projecting bolt 9, and in the unlocking position of the parts the withdrawn bolt is out of the path of the block.

To signal the movements of the lock-bolt 9, there are provided contacts, one of which, 11, is carried by the bolt and the other, 12, by the block 10, insulating material being interposed between the contacts and the parts to which they are secured. The bolt-contact is rigid, and the contact 12 is of spring metal and is interposed in the path of the contact 11, whereby to open and close the circuit in which they are connected. Wires 13 14 lead from the contacts 11 and 12, respectively, and are connected with the signaling mechanism, preferably in the following manner: Toward the free sides of the door are contacts 15, to which the ends of the wires 13 14 are connected, and said contacts are brought, when the door is in closed position, into engagement with similar contacts 16 on the door-frame, the contacts 15 16 being insulated from their supports. Wires 17 18 lead from the contacts 16 to the signaling mechanism, presently to be described, which wires form, when the door is closed, continuations of the wires 13 14. Obviously the making and breaking of the circuit consequent upon locking and unlocking the door and opening and closing the latter are utilized in the signaling operation, and it is likewise apparent that by the construction employed the accomplishment of such acts or any of them without instant warning is rendered impossible. The vault casing and door are provided at the inner side with an air-jacket formed of two sheets 19 20 of steel bolted in separated relation at close intervals to provide air-tight chambers in which air at a pressure of, say, twenty pounds to the square inch is confined. The vault-jacket is made in sections 21 21, connected to each other by communicating pipes 22 22, and the door-jacket 23 is connected with the vault-vestibule jacket by flexible pipes at the top and bottom. The pressure of the air contained in the jackets is indicated by an air-gage 24 at each side of the vault. Electric-circuit wires 25 26, which are connected with the signaling mechanism, lead to the gages, the ends of said wires entering the gage and being arranged in the path of a circuit-closer carried by the gage-pointer. If an aperture be made in the door-jacket or in any of the vault-jacket sections, the escape of the confined air will cause the pointer of the gage to drop and bring the circuit-closer into engagement with the ends of the wires 25 25, with the result of closing the circuit therethrough and sounding the alarm-signals.

The alarm-signal mechanism includes a gong 27, located on the outside of the vault. To prevent removal and unlawful tampering with the gong, there is provided a shield 28, which covers the gong and the ringing mechanism. The shield is constructed of two steel plates bolted together to provide an air-tight chamber for compressed air, which communicates with a pipe 29 and, by a smaller pipe 30, with a pipe 31 inclosing the pipe 29. The pipe 31 in turn communicates with the vault air-jacket. Consequently perforation of the shield will exhaust the air therein and in the vault-jacket and sound the alarm from gong 27, through the circuit-closer in the gage 24, in the manner above stated. To prevent the removal of the shield by prying without detection, I provide the following means: At the upper and lower ends of the shield are pipes 32 33, the former being fixed to the vault-casing, through which they are passed, and inclosing the pipes 33, which are secured to the shield. The pipes 33 each have at their rear end a collar or flange 34, and on the rear end of each of the pipes 32 is a collar or flange 35. Interposed between the flanges 34 35 and surrounding the pipe 33 is a coiled spring 36 to force the shield tightly against its seat on the vault-front. On the extreme rear end of each pipe 33 is a collar or flange 37, from which extends an arm 38 in juxtaposed relation to the stem 39 of a valve 40, arranged in a branch 41 of the pipe 30. The valve is normally held to its seat 42 by the pressure of the air in the pipe 30, and said valve is moved from its seat to exhaust the air and sound the alarm by the outward movement of the shield and pipe 33 and the consequent engagement of the arm 38 with the valve-stem 39. Inasmuch as the springs 36 will return the shield to its seat following an attempt to pry off said shield, it is necessary to provide some means by which an alarm will be sounded at the first attempt. Said means consist of spring-fingers 43, carried by the valve-stem, and of shoulders 44 on the inner side of the pipe extension 41, which shoulders form stops for the fingers and prevent the valve from closing after it has been even slightly moved from its seat. The extension 41 is open at its rear end, and when the valve is moved the air contained in the shield and jackets is quickly exhausted and the alarm is sounded, through the movement of the gage-pointer, in the manner above set forth.

45 denotes a baffle-plate secured around the shield-seat to prevent the insertion of an instrument for muffling the gong.

The switchboard 46 is mounted in a case 47, located within the vault. The case is provided with a hinged door or cover 48, having a suitable lock, which may be connected with the alarm-circuit, although such a connection is not essential. In the bottom of the case below the switchboard are a series of connected battery-cells 49 49, which supply the current. A circuit, which is lettered A, is formed by a wire 50, which leads from the positive side of the battery to a rheostat 51 at the front of the switchboard, and from the latter is led a wire 52, which connects with a drop 53. In the wire 52 is a switch 54. A wire 55 leads from one contact of the drop 53 to a binding-post on the case, to which post is also connected the wire 25, leading to the gage. The wire 26 is connected to a similar post from which leads a wire 56, connecting with a contact of a drop 57. A wire 58 connects drop 57 with the negative side of the battery. 59 59 are electric-light circuit-wires connected to the positive side of the battery and to the rheostat. Wires 60 61 lead from the wires 25 26 to the air-gage at the other side of the vault. A second circuit, which is lettered B, is formed by a wire 62, leading from the other contact of the drop 53 to a contact of a drop 63, located toward the upper end of the switchboard. A wire 64 leads from an adjacent contact of the drop 63 to a binding-post on the case, and from said post leads a wire 65, connected to the magnet 66 of the striking mechanism of the gong 27. The return-wire 67 leads to a binding-post, to which is connected a wire 68, leading to one post of a relay 69. Connecting a post of said relay with a contact of the drop 57 is a wire 70. Wires 71 72 lead from the wires 62 68 to an alarm-gong 73 on the switch. The gong, rheostat, switch, drops, and relay are arranged at the front of the switchboard, and the wiring is at the back. The alarm is operated by the current starting from the positive side of the battery with circuit A and running through the rheostat, switch 54, and drop 53 to the air-gage and returning therefrom through drop 57 to the negative side of the battery. If the circuit A is closed, the drops 53 and 57 operate and close the second or B circuit which comes from the positive side of the battery through circuit A to drop 53 and thence from drops 53 and 63 to alarm-gongs, returning through relay 69 and drop 57 to battery.

The signaling mechanism just described is operated to sound local alarms. If it is desired to effect the sounding of a distant alarm, I employ the switchboard 74, (shown in Fig. 5,) which may be at a police-station or, for instance, at the house of the banker. The wires 17 18, which connect when the vault-door is closed with the vault-lock wires 13 14, lead to binding-posts on the local switchboard-case 46. A wire 75 connects one of these posts with an opposite post of the relay 69, and leading from the other opposite relay-post is a wire 76, which connects with a post of a relay 77. A wire 78 leads from the other binding-post on the local switchboard-case to the positive side of a battery 79 in the distant switchboard-case, and a wire 80 connects the other post of the distant relay 77 with the negative side of said battery 79. This circuit C between the vault-door and the distant batteries 79 is normally closed.

A normally open circuit D between the drop 63 on the local switchboard and a battery 81 in the distant switchboard-case is formed by a wire 82, which leads from a contact on the drop 63 to the negative side of the distant battery 81, and a wire 83, which leads from a contact or rear drop 63, with the positive side of the battery 81. In the wire 83 and located at the front of the distant switchboard is an alarm-gong 84. A normally open circuit E on the distant switchboard is formed by a wire 85, leading from the positive side of the battery 81 to the gong 84, and a return-wire 86, in which is a switch 87, leading from the negative side of the gong to the relay 77, and thence to the wire 82. The circuit D, commencing on the positive side of the open-circuit batteries 81 in the distant switchboard-case, runs through the alarm bell or gong 84 to the vault in twin wire with circuit C through drop 63, which is operated by the circuit B. The switch on drop 63 is held to place by the spring. (Not shown.) When the alarm is sent in, the current is thrown through circuit B, drawing the switch up to the magnets and closing circuit D and sounding the alarm at the distant switchboard over circuit D in twin wire with circuit C. The circuit E commences at the positive side of the batteries 81 and runs through the alarm-bell on the distant switchboard through switch 87 and relay 77. Said relay is held in place by the closed-circuit batteries 79 through the closed circuit C. When the closed circuit C is broken, the switch is released, and the relay-spring closes the switch in the open circuit E and sounds the alarm through said circuit. This switch 87 may be used to ascertain at the house of the banker, for instance, whether the vault is properly closed and locked, as it is impossible to close the circuit C, which operates the relay 77, without closing the vault-door and throwing the bolts and throwing off the combination.

By the use of both closed and open circuits connecting the vault with the distant switchboard absolute security is obtained, owing to the fact that the alarm will be sounded by cutting the closed circuit or by bridging the open circuit.

Having thus described the invention, what is claimed as new is—

1. In a burglar-alarm, the combination of a closure for safety-vaults and the like, of means for fastening said closure carrying a contact, mechanism for locking said means carrying a contact, and an electric circuit, including a signal, connecting said contacts.

2. In a burglar-alarm, the combination with a vault or other door, draw-bolts for fastening said door one of said bolts carrying a contact, a lock for maintaining said bolts in fastening position, said lock having a bolt carrying a contact movable into engagement with the other contact, an electric circuit connected with said contacts, and signaling devices in said circuit.

3. In a burglar-alarm, the combination of a vault or other door, means for fastening said door, mechanism for locking said means, electric signaling devices, circuit-wires leading to contacts on the door-frame, contacts on the door for engaging the frame-contacts, and wires leading from the door-contacts to contacts on the fastening means and locking mechanism.

4. In a burglar-alarm for vaults and the like, the combination of an electric circuit including a gong on the outside of the vault, a compressed-air jacket for the vault, a shield for the gong, a valve controlling an escape-vent in the jacket, an arm carried by the shield, and a stem on the valve arranged to be engaged by the arm in the outward movement of the shield.

5. In a burglar-alarm for vaults and the like, the combination of an electric circuit including a gong on the outside of the vault, a compressed-air jacket for the vault, a shield for the gong, a tube connected with the shield and carrying a collar and an arm, a tube telescoping with the aforesaid tube and carrying a collar, a spring between the collars to force the shield to its seat, an exhaust-passage connected with the jacket, a valve in said passage, and a stem on the valve in the path of the arm.

6. In a burglar-alarm for vaults and the like, the combination of an electric circuit including a gong on the outside of the vault, a compressed-air jacket for the vault, a spring-held shield for the gong, an exhaust-passage in said jacket, a valve in said passage arranged to be unseated in the outward movement of the shield, and means for preventing the unseated valve from seating.

7. In a burglar-alarm, a gong connected with an electric circuit, a shield for the gong, and a baffle-plate around the shield-seat for the purpose specified.

In testimony whereof I affix my signature in presence of two witnesses.

CHARLES O. MILLER. [L. S.]

Witnesses:
 PETER L. CHRISTENSON,
 H. E. McCOY.